United States Patent [19]

Kume

[11] 4,455,975

[45] Jun. 26, 1984

[54] V-TYPE MULTI-CYLINDER INTERNAL COMBUSTION ENGINE

[75] Inventor: Tadashi Kume, Tokyo, Japan

[73] Assignee: Honda Giken Kogyo Kabushiki Kaisha, Tokyo, Japan

[21] Appl. No.: 339,136

[22] Filed: Jan. 13, 1982

[30] Foreign Application Priority Data

Jan. 16, 1981 [JP] Japan .................................. 56-3903
May 13, 1981 [JP] Japan ................................. 56-72026

[51] Int. Cl.$^3$ ............................................. F02B 19/00
[52] U.S. Cl. .......................... 123/52 MV; 123/55 VF; 123/55 VS; 123/55 VE; 123/195 AC; 123/195 R
[58] Field of Search ........ 123/195 R, 195 C, 195 AC, 123/52 MV, 55 VF, 55 VS, 55 VE, 55 VX

[56] References Cited

U.S. PATENT DOCUMENTS 2,771,865 11/1956 Kolbe ............................ 123/52 MV
2,926,647 3/1960 Welch ............................ 123/55 VE
4,346,676 8/1982 Tyner .............................. 123/55 VS

FOREIGN PATENT DOCUMENTS 658535 4/1938 Fed. Rep. of Germany ........ 123/52 MV

*Primary Examiner*—Craig R. Feinberg
*Assistant Examiner*—David A. Okonsky
*Attorney, Agent, or Firm*—Lyon & Lyon

[57] ABSTRACT

A V-type multi-cylinder internal combustion engine has a horizontal joint plane between the cylinder block and the intake manifold. Cylinder heads are mounted on the two banks of cylinders and each cylinder head has an inclined surface cooperating with a similar surface on the intake manifold to form fluid tight joints between them. Engine coolant passes through these joints to circulate through a heating water jacket to heat passages in the intake manifold.

3 Claims, 4 Drawing Figures

V-TYPE MULTI-CYLINDER INTERNAL COMBUSTION ENGINE

This invention relates to internal combustion engines and is particularly directed to V-type engines having two banks of cylinders arranged in the shape of the letter "V".

Prior art engines of this type have employed oblique mating surfaces between the intake manifold and the cylinder heads. That design has several disadvantages. It requires that close tolerances be held in the machining operation, increasing the cost of manufacture. Also, the oblique joint surfaces are subjected to relatively high fastening stresses with the possibility of resultant damage. Furthermore, it is troublesome and inefficient to require precise positioning of the oblique joint surfaces for exact alignment of bolt holes.

In prior art V-type engines, heat carried by the engine coolant is used to promote atomization of an air-fuel mixture passing through the intake manifold, but this has required a special casting process which has an adverse influence on the cost of mass producing the item.

It is therefore an object of the present invention to provide an intake manifold structure for a V-type internal combustion engine of the type described in which an intake manifold can be simply amd easily mounted on a cylinder block, resulting in marked improvement of assembly, and working efficiencies. This is accomplished by providing a horizontal joint plane between the intake manifold and the upper surface of the cylinder block between the two sides of the "V", and by securing the intake manifold to the cylinder block by means of bolts.

Another object of the present invention is to provide an intake manifold structure for such a V-type internal combustion engine, which can be produced by a conventional casting process providing mass production benefits. The diverging banks of cylinders of the cylinder block have sealing surfaces which contact the intake manifold, and thereby define a heating water jacket which opens into the cylinder block and/or the intake manifold.

Other objects and advantages will appear hereinafter.

Figure 1:
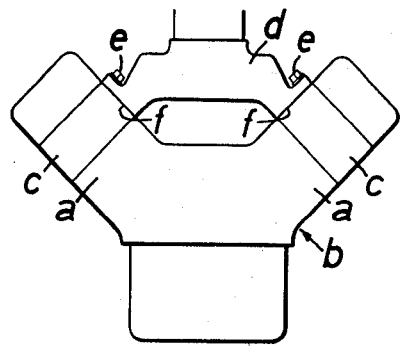
FIG. 1 is a front elevation showing a prior art device.

Referring to the drawings, the prior art structure shown in FIG. 1 has two banks of cylinders a forming a part of the cylinder block b and arranged in the shape of the letter "V". A cylinder head c is positioned on each bank of cylinders a, and the intake manifold d contacts the two cylinder heads c along the oblique surfaces f, and is held in place by bolts e. The fact that the surfaces f of the joint between the intake manifold d and the cylinder head c are formed obliquely imposes a requirement that close tolerances be held on the machining operations, thereby increasing the cost of manufacture. Moreover, the joint surfaces f are subjected to relatively high fastening stresses so that they are liable to be damaged. Furthermore, it is troublesome and inefficient to require precise positioning of the oblique joint surfaces f of the intake manifold d and the cylinder heads c for exact alignment of the bolt holes formed therein.

It is customary to form the intake manifold d with a heating water jacket known as "the hot water riser", into which hot water after cooling the engine is introduced to promote the atomization of an air-fuel mixture passing through the distribution passages in the intake manifold d. In this case, since the heating water jacket is formed as an independent water passage in the intake manifold d, such as intake manifold cannot be produced without resort to a special casting process which has an adverse influence on the ability to mass produce the item economically.

Figure 2:
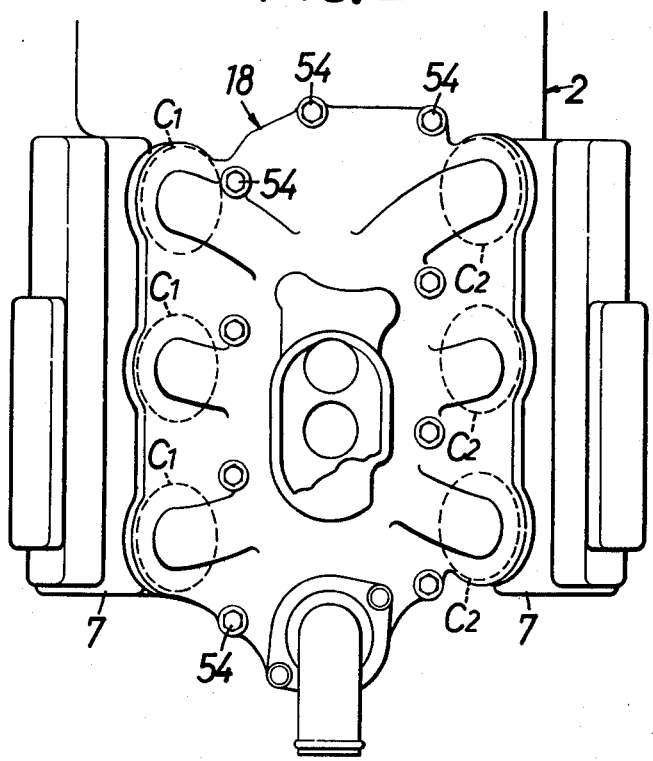
FIG. 2 is a top plan view showing a preferred embodiment of this invention.
Figure 3:
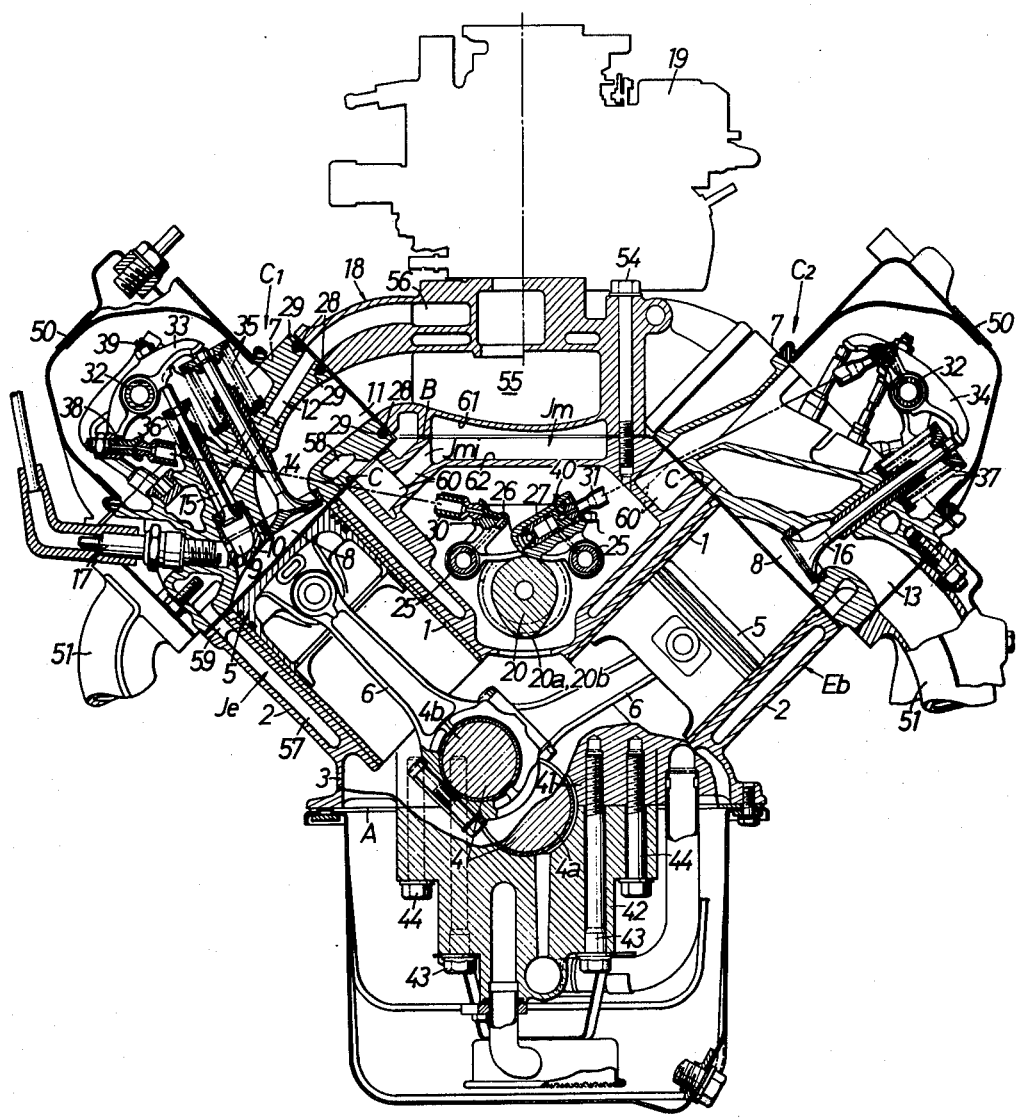
FIG. 3 is a sectional elevation of the device shown in FIG. 2.
Figure 4:
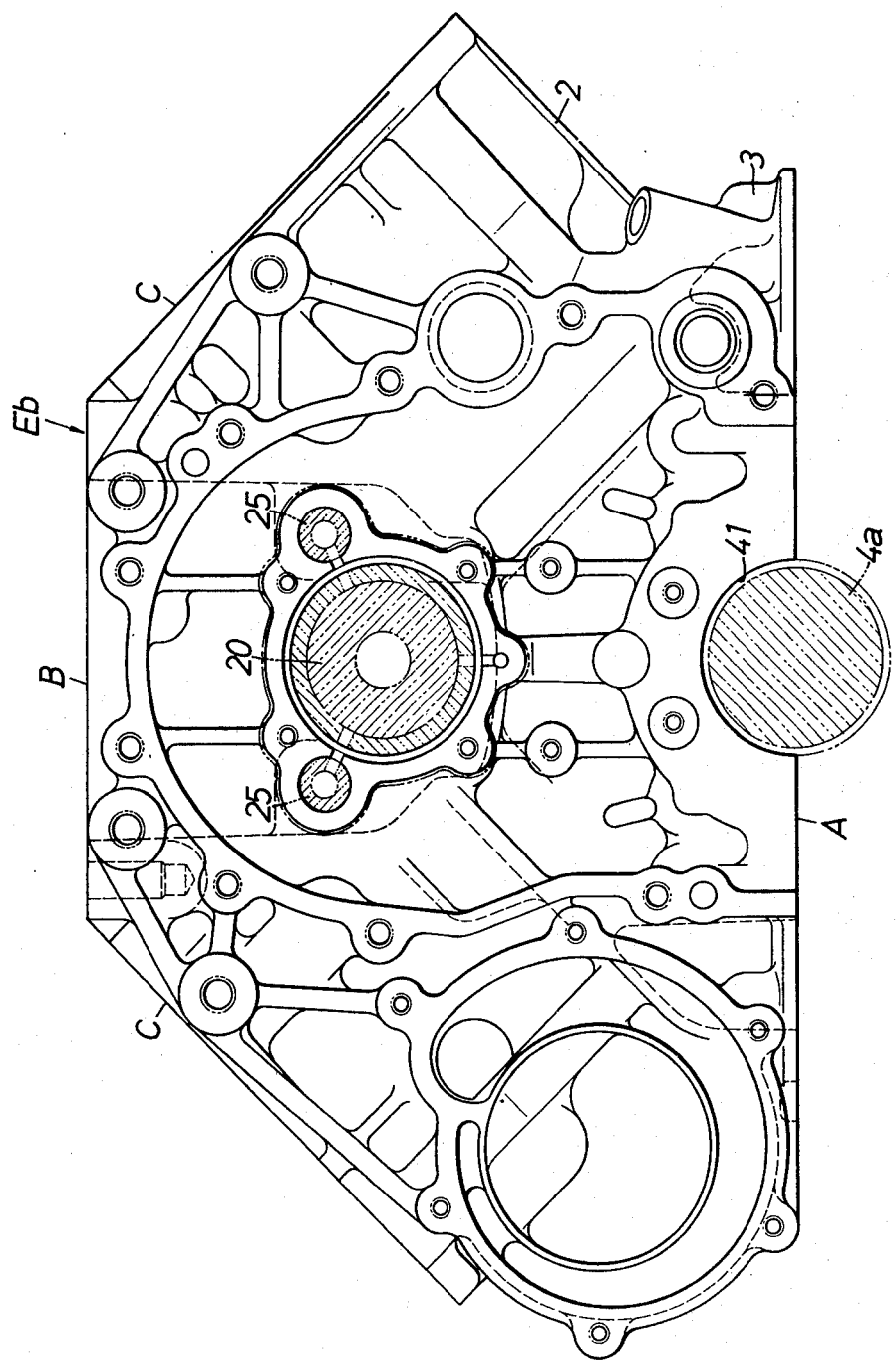
FIG. 4 is a front elevation of the engine block shown in FIGS. 2 and 3.

Referring to FIGS. 2, 3 and 4 of the drawings, a V-type multi-cylinder internal combustion engine has two banks of cylinders $C_1$ and $C_2$ arranged in the shape of the letter "V". A crank case 3 is formed integrally with and merges with the lower portion of the cylinder block 2. The cylinder block 2 and the crank case 3 jointly constitute the engine block Eb. A crank shaft 4 is supported by the journal portions 4a in the crank cases 3 and in a bearing cap 42 through a bearing 41. The joint plane A between the crank case 3 and the bearing cap 42 is horizontal and passes throught the axis of the journal 4a. As best shown in FIG. 4, the cylinder block 2 is provided with a central horizontal upper surface B comprising a reference plane which extends parallel with and at a predetermined spacing from the lower surface A of the crank case 3. Inclined surfaces C extend in opposite directions from the central plane surface B. The upper open ends of the cylinders 1 project through the respective cylinder head joint plane C.

Bearing cap 42 is fixed to the crank case 3 by means of one or more pairs of long bolts 43 arranged around the journal 4a, and at least one pair of shorter bolts 44 which are positioned outside the longer bolts 43.

The crank shaft 4 is provided with a plurality of crank pins 4b. A connecting rod 6 extends between each crank pin 4b and two of the pistons 5 which are slidably fitted in the respective cylinders 1. Cylinder heads 7 are secured on respective joint planes C of the cylinder block 2. Each of the pistons cooperates with its cylinder head 7 to form a main combustion chamber 8. An auxiliary combustion chamber 9 communicates with the main combustion chamber 8 through a torch opening 10. A main intake port 11 and an exhaust port 13 open into the main combustion chamber 8, and an auxiliary intake port 12 communicates with the auxiliary combustion chamber 9. The main intake port 11, the auxiliary intake port 12, and the exhaust port 13 are opened and closed by a main intake valve 14, and auxiliary intake valve 15 and an exhaust valve 16, respectively. Springs 35, 36 and 37 act to bias the valves toward closing position. Ignition plugs 17 threaded into the cylinder heads 7 have their electrodes facing the auxiliary combustion chambers 9.

The intake manifold 18 is mounted on the horizontal surface B of the engine block Eb between the cylinder heads 7 and the two cylinder banks $C_1$ and $C_2$, and is held in place by vertically extending bolts 54. The intake manifold 18 has its opposite inclined sides abutting the opposing inclined side surfaces of the cylinder heads 7. Seals 28, e.g. elastic O-ring seals are positioned in seal grooves 29 to prevent leakage at the joints between the intake ports 11 and 12 and the distribution passages 55 and 56, respectively. A carburetor 19 is secured to the upper surface of the intake manifold 18, and is constructed to provide a lean mixture and a rich mixture. The lean mixture is distributed to all of the main intake ports 11, and the rich mixture is distributed to all of the auxiliary intake ports 12.

Thus, in each cylinder 1, when the main and auxiliary intake valves 14 and 15 are opened during the suction stroke of the piston 5, the lean mixture is fed through the main intake port 11 to the main combustion chamber 8, and the rich mixture is fed through the auxiliary intake port 12 to the auxiliary combustion chamber 9. During the subsequent compression stroke, the rich mixture in the auxiliary combustion chamber 9 is ignited by the ignition plug 17 so that the resultant flame propagates through the torch opening 10 into the main combustion chamber 8, thereby to ignite and burn the lean mixture in the main combustion chamber 8. As a result, the relatively lean mixture having a high overall air-fuel ratio can be burned. Thus, the piston 5 moves in its expansion stroke, and, when the exhaust valve 16 is opened during the subsequent exhaust stroke, the exhaust gas is discharged through the exhaust port 13 and into an exhaust pipe 51.

Each of the cylinder banks $C_1$ and $C_2$ is equipped with a cooling water jacket Je. This water jacket Je includes a lower jacket 57, which is so formed in the cylinder block as to surround the cylinders 1, and an upper jacket 58 which is so formed in the cylinder heads as to surround the main and auxiliary intake ports 11 and 12, the exhaust ports 13, and the ignition plugs 17, etc. The jackets 57 and 58 are connected with each other through a communication opening 59 which extends through the joint plane C between the cylinder block 2 and the cylinder heads 7. The upper jacket 58 merges into one end of a communication passage 60 which extends through the joint plane, and which has its other end open as an inlet Jmi into a heating water jacket Jm adjacent to the lower surface of the main distribution passage 55 of the intake manifold 18.

The heating water jacket Jm is defined by the opposing surfaces of the intake manifold 18 and the cylinder block 2 and is formed, in the shown embodiment, with recesses 61 and 62 which are so shaped as to open at those opposing surfaces. While the heating water jacket Jm is shown as being partly contained within the intake manifold 18 and in the cylinder block 2, the entire volume of the jacket Jm might be positioned in either the cylinder block 2 or the intake manifold 18, the other member being left flat so as to close the recess.

The lower portion 57 of the cooling water jacket Je communicates with an outlet port of a water pump, not shown, whereas the heating water jacket Jm communicates with an inlet port of a radiator, not shown. Thus, during the running operation of the engine, the cooling water from the pump first flows into the lower portion 57 of the jacket Je to cool the metal parts forming the cylinders 1, and the cooling water further flows through the communication passage 59 into the upper portion 58 of the jacket Je to cool the metal near the exhaust valves 16 and the ignition plugs 17. This water as thus heated serves to heat the metal near the main and auxiliary intake ports 11 and 12 and then flows through the communication passage 60 into the heating water jacket Jm. The water then heats the main distribution passage 55 of the intake manifold 18 and thereby serves to promote the atomization of the lean mixture passing through the passage 55. The hot water from the chamber Jm then passes to the radiator, not shown, where it liberates its heat. The water is then recirculated by means of the pump.

A cam shaft 20 is mounted in the cylinder 2 in a symmetrical position between the two cylinder banks $C_1$ and $C_2$ and as close to the crank shaft 4 as possible. A pair of right and left follower shafts 25 are so arranged between the cam shaft 20 and their respective cylinder banks $C_1$ and $C_2$ as to interpose the cam shaft 20 between them. Both an intake rocker follower 26 and an exhaust rocker follower 27 are mounted to turn on each follower shaft 25. Each follower 26 has a flat surface engaging the intake cam 20a and each follower 27 has a flat surface engaging exhaust cam 20b. The other rocking end of each follower has a spherical surface which is contacted by the lower ends of the intake push rod 30 and the exhaust push rod 31, respectively.

The intake and exhaust rocker arms 33 and 34 are mounted on the rocker shaft 32 which is supported on each of the cylinder heads 7. The main intake valve 14 has its stem end abutting against and contacting the leading end of the arm of the intake rocker arm 33, and the auxiliary valve 15 has its stem end abutting against and contacting the intermediate portions of the intake rocker arm 33. The intake push rod 30 has its upper ends spherically contacting the leading end portions of the outer arm of the rocket arm 33. Similarly, the exhaust valve 16 has its stem end abutting against and contacting the leading end portion of the outer arm of the exhaust rocket arm 34. The exhaust push rod 31 has its upper end spherically contacting the leading end portion of the inner arm of the rocker arm 34. The intake rocker arm 33 is equipped with valve head clearance adjust bolts 38 and 39 at its spherically contacting portion with the push rod 30 and at its abutting portion against the auxiliary intake valve 15. The exhaust rocker arm 34 is not equipped with such bolts, but a hydraulic tappet mechanism 40 is mounted instead in the exhaust rocker follower 27. Head covers 50 are provided for the valve actuating mechanism, and the exhaust ports 13 lead to the exhaust manifold 51.

Having fully described my invention, it is to be understood that I am not to be limited to the details herein set forth but that my invention is of the full scope of the appended claims.

I claim:
1. A V-type multi-cylinder internal combustion engine comprising, in combination: a cylinder block having two banks of cylinders arranged in a shape of a letter "V" and having a horizontal joint plane at its upper surface, a pair of cylinder heads with each mounted on one bank of cylinders, respectively, an intake manifold positioned between said cylinder heads and secured to the cylinder block only on said horizontal joint plane by means of vertically extending bolts, said cylinder heads each having an inclined surface receiving and facing a similarly inclined surface on said intake manifold, each cylinder and its cylinder head defining at least one combustion chamber, each of the cylinder heads including intake port means leading to each combustion chamber, said intake manifold having distribution passages aligned with said intake port means, a groove in at least one of the two facing surfaces of said intake manifold and each cylinder head surrounding each said aligned intake port means and distribution passage, and an O-ring seal means positioned in each said groove for resiliently connecting each said aligned said intake port means and said distribution passage means.

2. A V-type multi-cylinder internal combustion engine, comprising, in combination: a cylinder block having two banks of cylinders arranged in a shape of a letter "V" and having a horizontal joint plane at its upper surface, a pair of cylinder heads with each mounted on one bank of cylinders, respectively, an intake manifold positioned between said cylinder heads and having a lower surface, said intake manifold being only secured on the horizontal joint plane to said cylinder block fixedly via said lower surface, said cylinder heads having inclined surfaces jointed through elastic seals to opposing inclined surfaces of said cylinder heads, said horizontal joint plane of said cylinder block and said lower surface of said intake manifold each having recesses positioned in opposed relationship and cooperating to form a heating water jacket between said cylinder block and said intake manifold, and means for circulating engine coolant through said heating water jacket.

3. The combination set forth in claim 2 wherein the heating water jacket includes an inlet formed in said cylinder block.

* * * * *

UNITED STATES PATENT AND TRADEMARK OFFICE
CERTIFICATE OF CORRECTION

PATENT NO.  : 4,455,975
DATED       : June 26, 1984
INVENTOR(S) : Tadashi Kume

It is certified that error appears in the above—identified patent and that said Letters Patent is hereby corrected as shown below:

Column 2, line 24 correct the word "through".

Column 2, line 64 insert a comma between "seals" and "are".

Signed and Sealed this

Twenty-eighth Day of May 1985

[SEAL]

*Attest:*

DONALD J. QUIGG

*Attesting Officer*  *Acting Commissioner of Patents and Trademarks*